(12) United States Patent
McDermott et al.

(10) Patent No.: US 7,515,553 B2
(45) Date of Patent: Apr. 7, 2009

(54) GROUP SYNCHRONIZATION BY SUBGROUPS

(75) Inventors: Michael James McDermott, Oronoco, MN (US); Robert Miller, Rochester, MN (US); Michael John Snyder, Lake City, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 10/454,854

(22) Filed: Jun. 5, 2003

(65) Prior Publication Data

US 2004/0246910 A1 Dec. 9, 2004

(51) Int. Cl.
*H04L 12/28* (2006.01)
(52) U.S. Cl. ..................... 370/255; 370/400
(58) Field of Classification Search ............. 370/254, 370/255, 400; 707/10
See application file for complete search history.

(56) References Cited

U.S. PATENT DOCUMENTS

| | | | | |
|---|---|---|---|---|
| 5,890,003 | A * | 3/1999 | Cutts et al. | 710/263 |
| 6,490,586 | B1 * | 12/2002 | Goft et al. | 707/10 |
| 6,839,752 | B1 * | 1/2005 | Miller et al. | 709/224 |
| 6,862,613 | B1 * | 3/2005 | Kumar et al. | 709/220 |
| 2001/0029518 | A1 * | 10/2001 | Badovinatz et al. | 709/102 |
| 2006/0031438 | A1 * | 2/2006 | Tokuhashi et al. | 709/223 |

* cited by examiner

*Primary Examiner*—Seema S Rao
*Assistant Examiner*—Sai-Ming Chan
(74) *Attorney, Agent, or Firm*—Fleit Gibbons Gutman Bongini & Bianco PLLC

(57) ABSTRACT

A computing system group processing architecture that facilitates asymmetric processing at different computing nodes within a group or cluster of nodes. Nodes within a group are assigned to subgroups. Each node in a subgroup performs similar processing, but nodes in different subgroups are able to perform different processing for the same group level protocol. All nodes monitor processing completion votes that are cast by all nodes, and node in subgroups that finish processing before other subgroups synchronize to the processing of those other subgroups by casting dummy votes during vote rounds of other subgroups that are still processing their subgroup protocol.

15 Claims, 6 Drawing Sheets

VOTING TIMELINE

| | RECEIVE PROTOCOL (502) | VOTE 1 (504) | VOTE 2 (506) | VOTE 3 COMPLETION VOTE (508) | |
|---|---|---|---|---|---|
| NODE 1 | R | X | X | X | |
| NODE 2 | R | X | X | X | |
| NODE 3 | R | X | D | D | |
| NODE 4 | R | X | D | D | |

TIME →

GROUP SYNCHRONIZATION BY SUBGROUPS

BACKGROUND OF THE INVENTION

1. Field of the Invention

This invention relates to operation of automated data processing equipment and more specifically to automated data processing equipment that utilizes multiple cooperating processors.

2. Description of Related Art

Automated data processing applications often execute on processing systems that have multiple processors. These multiple processors are frequently organized as groups and all of the members or nodes within the group operate in a cooperative and parallel manner. An example of a tightly integrated group of processors is a multiple processor computing cluster. One or more of these processors within a group can be referred to as a "node," where a node is defined as one or more processors that are executing a single operating system image. A node that is part of a group is referred to herein as a member of the group or a member node. The various members within a group are connected by a data communications system that supports data communications among all of the group members.

Communications among the members of a group is typically performed by a standard communications mechanism. These standard communications mechanisms are typically reliable and ordered, which means that the group communications system ensures that all members of a group receive all of the messages in the exact same order as all of the other members of the group.

Members of a computing system group, such as computing nodes within a cluster or other type of computing system group, are often assigned a series of computing tasks to perform. A unit of work that is distributed to all members of a computing system group is referred to as a "Protocol." Group protocols are generally communicated to each member using the reliable and ordered group communications system. This results in all members of the group working on the protocol together, and exiting the protocol together.

More than one group can be connected together to allow these multiple groups to handle more complex computing tasks. The processing performed by each of these groups can have a dependency on another group. For example, a group performing an application task might have a dependency on another group that is performing data storage tasks. The data storage task must produce data that is required by the application task before the application task is able to execute.

These group messaging techniques assume that all nodes require the same information as all other nodes and do not directly support dependencies among or between groups. This has resulted in the development of mechanisms outside of the group structure to handle subtask processing within and among groups. This has added complexity and additional effort in the development of inter-dependent processing protocols.

Therefore a need exists to overcome the problems with the prior art as discussed above, and particularly for a way to more efficiently support inter-dependent tasks that operate within or among one or more computing groups.

SUMMARY OF THE INVENTION

The present invention, according to a preferred embodiment, overcomes problems with the prior art by allowing the definition of subgroups within a computing group and allowing each subgroup to perform a sub-protocol in order to perform a group-wide protocol. Voting upon completion of processing by the various nodes of the group is performed on a subgroup basis and each subgroup is able to have a different number of votes within each concurrently initiated sub-protocol. The exemplary embodiments of the present invention allow much easier synchronization among the various nodes within the subgroups by having a much more straightforward mechanism for synchronization of the subgroups than is used in the prior art.

Briefly, in accordance with the present invention, a method for performing processing among a plurality of nodes consists of assigning a node that is part of a computing system group to a subgroup. The method then receives a protocol message at the node. This protocol message is received by all nodes in the computing system group. The method also executes a subgroup protocol at the node. This subgroup protocol corresponds to the subgroup.

In another aspect of the present invention, a member of a computing system group has a subgroup identifier that assigns a node that is part of a group to a subgroup. The member also has a communications system interface that receives a protocol message at the node. This protocol message is received by all nodes with the computing system group. The member also has a processor that executes a subgroup protocol at the node. The subgroup protocol executed by the node corresponds to the subgroup.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter which is regarded as the invention is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 5 is a voting timeline for a protocol that has two subgroup protocols according to an exemplary embodiment of the present invention.

DESCRIPTION OF THE PREFERRED EMBODIMENTS

The present invention, according to a preferred embodiment, overcomes problems with the prior art by allowing the definition of subgroups within a computing group and allowing each subgroup to perform a sub-protocol in order to perform a group-wide protocol. Voting upon completion of processing by the various nodes of the group is performed on a subgroup basis and each subgroup is able to have a different number of votes within each concurrently initiated sub-protocol. These embodiments advantageously allow the definition of different subgroups within a larger group of computing nodes. This allows all of the nodes to receive all group messages, thereby facilitating synchronization of processing across all nodes within the group, while allowing different subgroups of nodes to perform different processing for each message. This provides an advantage over the prior art, where different groups were defined in order to support different processing at different nodes. The exemplary embodiments of the present invention allow much easier synchronization among the various nodes within the subgroups. The synchronization mechanism of the exemplary embodiments of the present invention is much more straightforward than synchronization of processing across different groups, as is performed in the prior art.

Computing System Group

Figure 1:
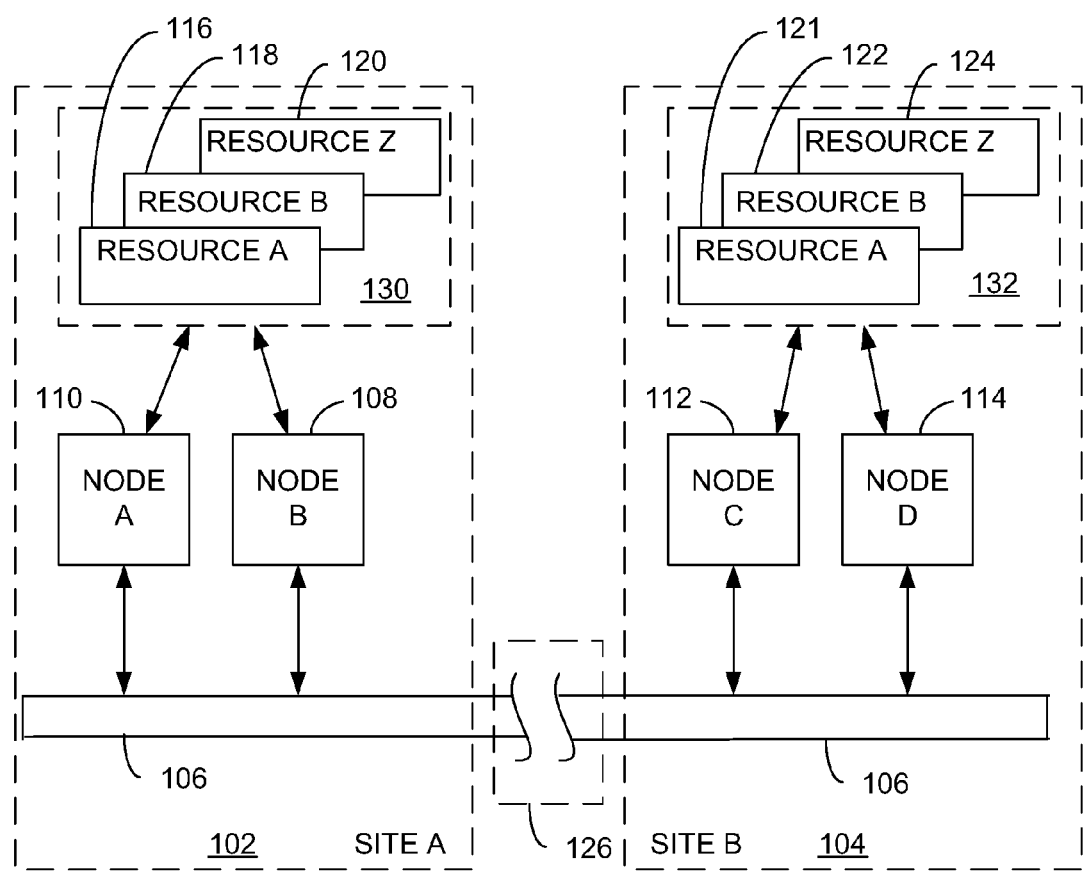
FIG. 1 is a computing system group illustrating the overall system architecture of an exemplary embodiment of the present invention.

Referring now in more detail to the drawings in which like numerals refer to like parts throughout several views, an exemplary computing system group 100 in which exemplary embodiments of the present invention operate is illustrated in FIG. 1. The exemplary computing system group 100 shows two sites, Site A 102 and Site B 104. Embodiments of the present invention operate with any number of sites, including one site to any number that can be accommodated by the communications systems used by the embodiment. The sites as used in this example are defined to be a group of computer nodes that have access to resources that are within one resource pool. For example, the nodes within Site A 102, i.e., Node A 110 and Node B 108, have access to the resources within Resource Pool A 130, i.e., Resource A 116, Resource B 118, and Resource Z 120. Similarly, the nodes within Site B 104, i.e., Node C 112 and Node D 114, have access to the resources in Resource Pool B 132, i.e., Resource A 121, Resource B 122 and Resource Z 124.

Each site in the exemplary embodiment has a number of nodes. Site A 102 is shown to have a Node A 110 and a Node B 108. These nodes are connected via a data communications network 106 that supports data communications between nodes that are part of the same site and that are part of different sites. Each node has a communications system interface to support communications between and among the various nodes in the site and group.

In this example, the sites are geographically removed from each other and are interconnected by an inter-site communications system 126. The inter-site communications system 126 connects the normally higher speed data communications network 106 contained within each site. The inter-site communications system 126 of the exemplary embodiment utilizes a high speed connection. Embodiments of the present invention utilize various inter-site communications systems 126 such as conventional WAN architectures, landline, terrestrial and satellite radio links and other communications techniques. Embodiments of the present invention also operate with any number of sites that have similar interconnections so as to form a continuous communications network between all nodes of the sites. Embodiments of the present invention also include "sites" that are physically close to each other, but that have computer nodes that do not have access to resources in the same resource pool. Physically close sites are able to share a single data communications network 106 and not include a separate inter-site communications system 126.

Resources contained within resource pools, such as Resource Pool A 130 and Resource Pool B 132, include data storage devices, printers, and other peripherals that are controlled by one node within the group. In the exemplary embodiments, a node is equivalent to a member of a computing system group. In the computing system group 100, one node or member is designated as the primary member for the group. The primary group member hosts primary resources for the computing group and acts as the point of access and hosts the resources managed by the group.

In addition to a primary group member, each site within the exemplary computing system group 100 has a primary site member. A primary site member performs similar processing as the primary group member but only for the nodes or members located at that site.

Computer Nodes and Group Members

Figure 2:
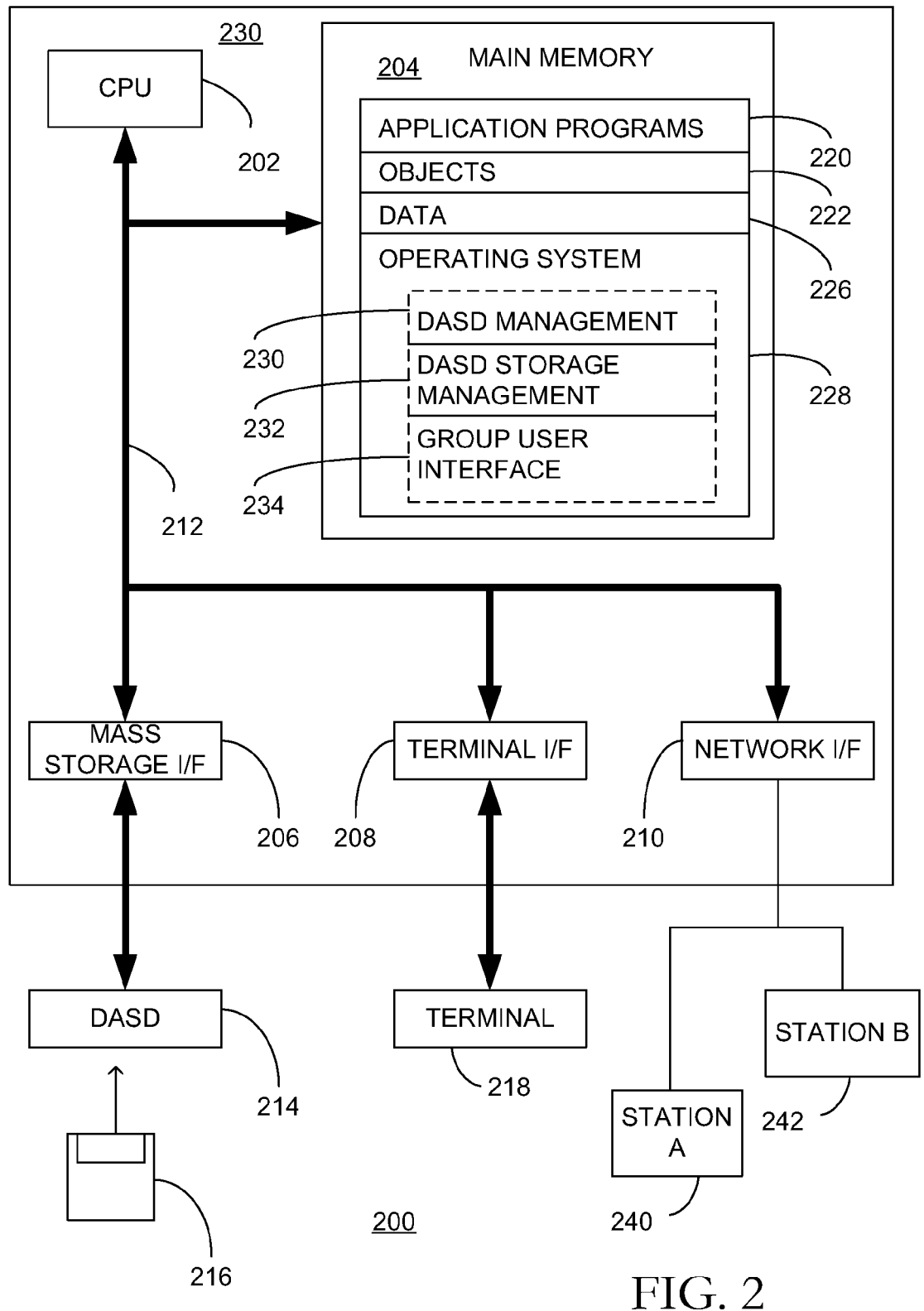
FIG. 2 is a block diagram depicting a group member of the group shown in FIG. 1, according to an exemplary embodiment of the present invention.

A block diagram depicting a group member 200, which is a computer system in the exemplary embodiment, of the group 100 according to an embodiment of the present invention is illustrated in FIG. 2. The group member 200 of the exemplary embodiment is an IBM eServer iSeries server system. Any suitably configured processing system is similarly able to be used by embodiments of the present invention. The computer system 200 has a processor 202 that is connected to a main memory 204, mass storage interface 206, terminal interface 208 and network interface 210. These system components are interconnected by a system bus 212. Mass storage interface 206 is used to connect mass storage devices, such as DASD device 214, to the computer system 200. One specific type of DASD device is a floppy disk drive, which may be used to store data to and read data from a floppy diskette 216.

Main Memory 204 contains application programs 220, objects 222, data 226 and an operating system image 228. Although illustrated as concurrently resident in main memory 204, it is clear that the applications programs 220, objects 222, data 226 and operating system 228 are not required to be completely resident in the main memory 204 at all times or even at the same time. Computer system 200 utilizes conventional virtual addressing mechanisms to allow programs to behave as if they have access to a large, single storage entity, referred to herein as a computer system memory, instead of access to multiple, smaller storage entities such as main memory 204 and DASD device 214. Note that the term "computer system memory" is used herein to generically refer to the entire virtual memory of computer system 200.

Operating system 228 is a suitable multitasking operating system such as the IBM OS/400 operating system. Embodiments of the present invention are able to use any other suitable operating system. Operating system 228 includes a DASD management user interface program 230, a DASD storage management program 232 and a group user interface program 234. Embodiments of the present invention utilize architectures, such as an object oriented framework mechanism, that allows instructions of the components of operating system 228 to be executed on any processor within computer 200.

Although only one CPU 202 is illustrated for computer 202, computer systems with multiple CPUs can be used equally effectively. Embodiments of the present invention incorporate interfaces that each include separate, fully programmed microprocessors that are used to off-load processing from the CPU 202. Terminal interface 208 is used to directly connect one or more terminals 218 to computer system 200. These terminals 218, which are able to be nonintelligent or fully programmable workstations, are used to allow system administrators and users to communicate with computer system 200.

Network interface 210 is a communications system interface that is used to connect other computer systems or group members, e.g., Station A 240 and Station B 242, to computer system 200. The present invention works with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 216, CD ROM, or other form of recordable media, or via any type of electronic transmission mechanism.

Embodiments of the present invention include an operating system 228 that includes a DASD management user interface program 230 that performs functions related to configuration, operation and other management functions, including functions for selecting one or more DASDs for an auxiliary storage pool (ASP). An ASP is defined as a set of disk units, and an independent auxiliary storage pool (IASP) is a set of disk units independent of a system. An IASP can be switched between systems, if its disk units are switchable and follow configuration and placement rules. The DASD management user interface program 230 is able to communicate with DASD storage management (DSM) program 232, which is a component of operating system 228 that provides internal support for managing disk units.

A computing system group, such as the computing system group 100 of the exemplary embodiment, uses a group communications mechanism to communicate messages to all members of the group. Active group members receive all group messages, which are messages that are broadcast to all members of the group, and the group communications mechanism ensures these group messages are all received in the same order. An example of a group message is a command to add a user to an access control list.

The exemplary embodiments of the present invention allow a group protocol to execute on the different nodes of a group while supporting different processing on subgroups of nodes within the group. These embodiments assign at least one node within the computing system group to a subgroup. A protocol, which is a set of work that is distributed to each member of the group and which specifies processing that all members of the group is to execute, is submitted to the group and communicated via the group communications mechanism. The nodes of the computing system groups in the exemplary embodiments can be assigned to different subgroups and the processing for each node is dependent upon the subgroup membership of that node. A group protocol generally involves sending the same sequence of instructions to all nodes. The exemplary embodiments of the present invention include nodes that are configured to execute different processing for these instructions based upon the subgroup to which the particular node is assigned.

Figure 3:
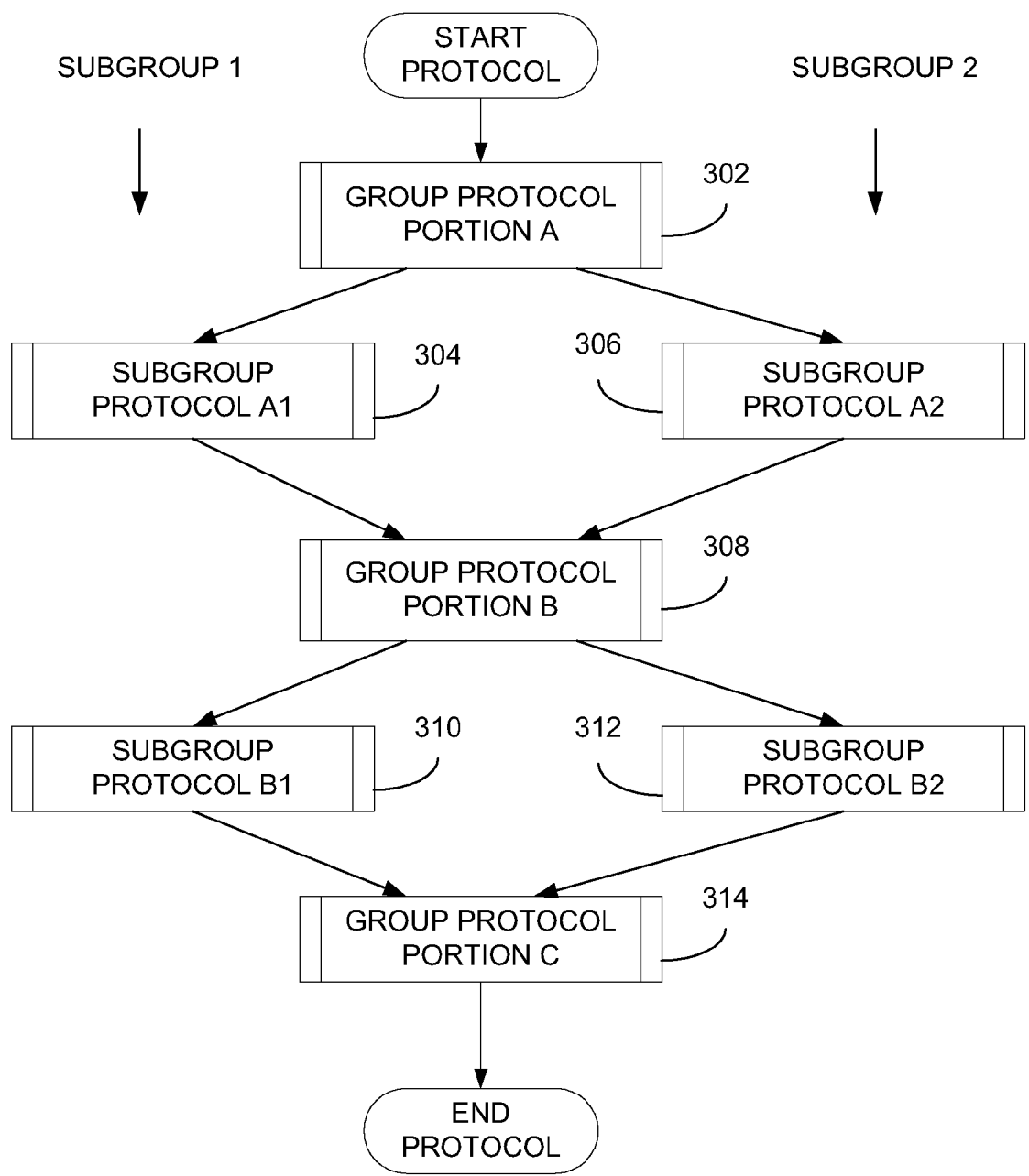
FIG. 3 is an exemplary protocol as is processed by an exemplary embodiment of the present invention.

An exemplary protocol 300 as is used by an exemplary embodiment of the present invention is illustrated in FIG. 3. This exemplary protocol is executed by a computing system group 100 that is divided into two subgroups, a subgroup 1 and a subgroup 2. Some nodes of the computing system group are assigned to subgroup 1 and other nodes are assigned to subgroup 2. The subgroup division is based upon the processing that each node is required to perform for the protocol, e.g., according to the site location in the exemplary embodiment. The protocol 300 begins with a group protocol portion A 302.

Group protocol portion A is performed as a conventional group protocol by each node within the computing system group 100. After group protocol portion A 302 is completed, each of the nodes of the exemplary computing system group 100 execute one of either subgroup Protocol A1 304 or subgroup Protocol A2 306 depending upon the subgroup to which that node is assigned. The subgroup protocols in the exemplary embodiment are performed by executing processing within each node that corresponds to the particular subgroup to which the node is assigned. The subgroup synchronization mechanism of the exemplary embodiments of the present invention, as is described below, advantageously ensures that the processing for subgroup Protocol A1 304 and subgroup Protocol A2 306 terminate at the same time.

After execution of subgroup Protocol A1 304 and subgroup Protocol A2 306, the group in this example continues executing the group protocol by executing group protocol portion B 308. Group protocol portion B 308 is executed by all nodes in the computing system group 100 in a conventional manner. This is facilitated by the mechanism of the exemplary embodiments that ensure that the preceding subgroup protocols terminate at the same time. After executing group protocol portion B, the nodes of the computing system group 100 continue the processing of this example group protocol 300 by executing one of either subgroup Protocol B1 310 or subgroup Protocol B2 312. The one or more nodes assigned to subgroup 1 execute subgroup Protocol B1 310 and the one or more nodes of the computing system group that are assigned to subgroup 2 execute subgroup Protocol B2 312 in this example. The subgroup synchronization mechanism of the exemplary embodiments of the present invention, as is described below, ensures that the processing for subgroup Protocol B1 310 and subgroup Protocol B2 312 terminates at the same time.

After subgroup Protocol B1 310 and subgroup Protocol B2 312 finish, the nodes of the computing system group then continue to execute group protocol portion C 314. All nodes of the group execute this portion in a conventional manner. The processing for this protocol then terminates.

Group protocols are able to contain any sequential combination of group protocols and subgroup protocols. The exemplary protocol 300 illustrates a mixing of group level protocols, which involve similar processing by all nodes within the group, and subgroup protocols, which involve similar processing by nodes within the same subgroup but that processing is generally different for processing nodes that are in different subgroups. It is to be understood that the structure of the exemplary protocol 300 is not limiting in the construction of protocols for use by embodiments of the present invention.

Figure 4:
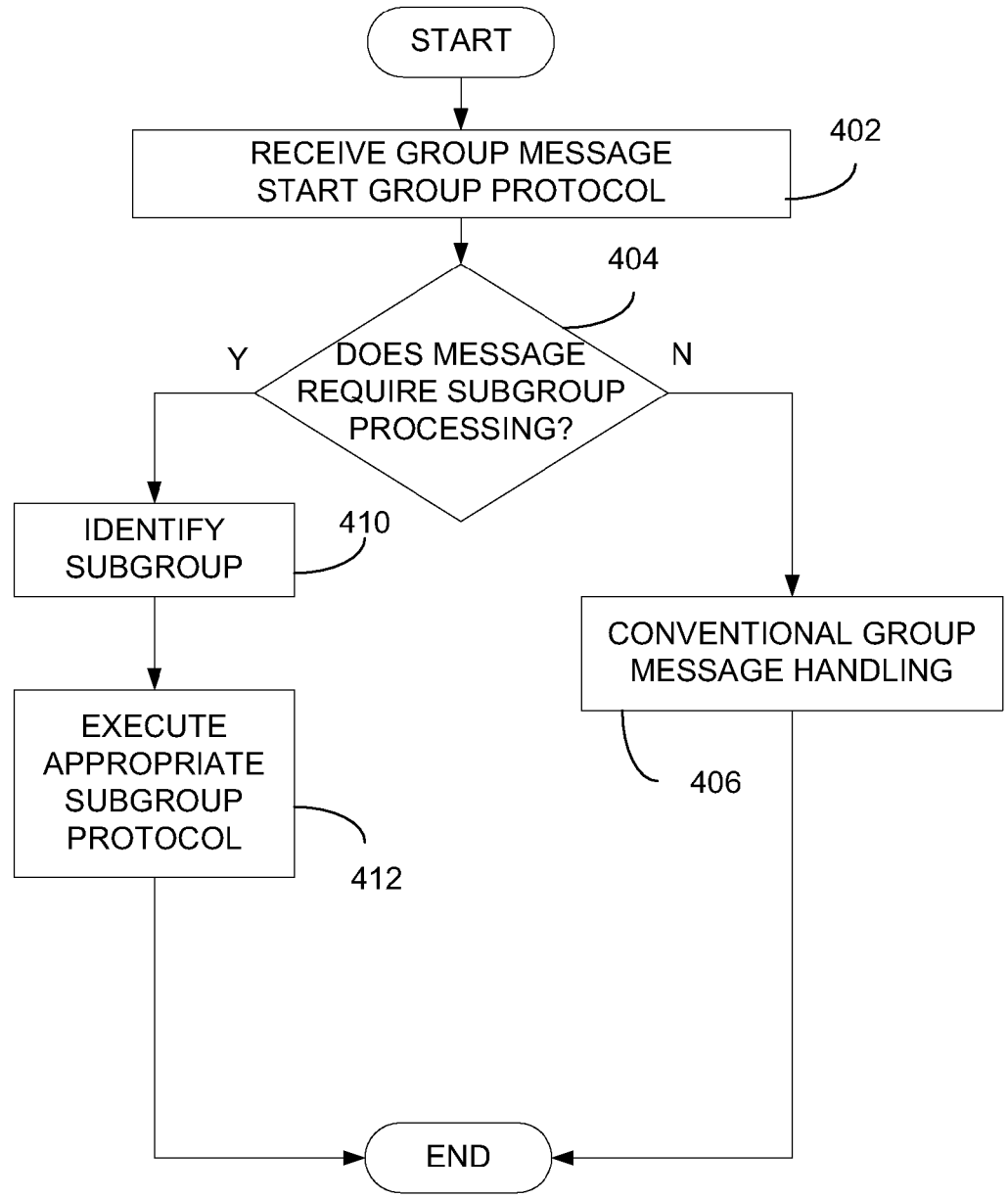
FIG. 4 is a group protocol processing flow as is performed by a member or node of a computing system group according to an exemplary embodiment of the present invention.

An exemplary group protocol processing flow 400 as is performed by a member or node of a computing system group according to an exemplary embodiment of the present invention is illustrated in FIG. 4. The exemplary group protocol processing flow 400 begins with the group member receiving, at step 402 a group message that defines a protocol to be performed by the group or a message that specifies a portion of a protocol that is to be performed by the group. The group member or node then begins the processing, at step 402, that is required by the group protocol. The processing next determines, at step 404, whether the group message that was received, and that specifies a group protocol or a portion of a group protocol, requires subgroup processing. The nodes of the exemplary embodiment include processing within each node or group member to determine if subgroup processing is required for a received group message and the subgroup processing is also defined within each node or group member.

An example of a group with different processing for each subgroup is a two site group where each site has two nodes and one IASP. This first site, or subgroup, has two nodes, node A and node B, and IASP I1. The second site, or subgroup, has nodes C and D and IASP I2. The second site in this example contains a backup of IASP I1 on IASP I2. The site primaries in this example are initially node A and node C. In the case of a failure of node C in this example, the failure is reported to the group by a group message. In response to this group message, the first subgroup re-directs is replication information to node D and node D now becomes the new primary of the second subgroup. The nodes of site 1 now send their replication information to node D. In this example, the nodes of site D did not send any replication information to node D while node D was becoming the primary node for the second site. If the message does not require group message processing, the processing continues by performing, at step 406, conventional group message handing.

If the message is determined to require subgroup processing, the processing of this exemplary embodiment continues by identifying, at step 410, the subgroup to which this node or group member belongs. The nodes or group members of the computing system group 100 of the exemplary embodiment are configured with a subgroup identifier that identifies the subgroup to which this node is assigned. The subgroup identifier in the exemplary embodiment is the site name that is associated with that subgroup. The processing then continues by executing, at step 412, the appropriate subgroup protocol for the subgroup to which this node or member belongs. After executing the appropriate subgroup protocol, the processing for this protocol terminates.

The group and subgroup protocols executed by the computing system group 100 of the exemplary embodiment have specified "votes" by each node to indicate completion of processing of a portion or of all of the protocol. Votes in the exemplary embodiment are communicated via group messages that are communicated to all group members. The subgroup protocol processing that is performed in parallel by the different subgroups of nodes or group members in the exemplary embodiment, such as subgroup Protocol A1 304 and subgroup Protocol A2 306, are allowed to have different numbers of subgroup votes, and even no votes at all, in order to support the asymmetrical nature of the processing of these different subgroup protocols that execute in parallel. The processing for subgroup protocols transmits votes that indicate if the transmitted vote is a subgroup vote or a group level vote. In order to support proper group level protocol execution, all group level protocols and subgroup protocols end with a completion vote. In the exemplary embodiments, all nodes or group members monitor all group votes and all subgroup votes.

An exemplary voting timeline 500 for a protocol that has two subgroup protocols is illustrated in FIG. 5. In this example, Node 1 and Node 2 are in a first subgroup, and Node 3 and Node 4 are in a second subgroup. In this example, a different subgroup protocol processing is performed on these nodes based upon the subgroup with which the node is associated. In this example, subgroup 1, which includes Node 1 and Node 2, is executing on both of these nodes a similar subgroup protocol processing that has three subgroup votes. Subgroup 2 in this example, which includes Nodes 3 and 4, is executing a subgroup protocol processing that differs from the subgroup protocol processing executed by subgroup 1 and that requires only one subgroup vote. As illustrated in the exemplary voting timeline 500, all nodes receive the group protocol within a first time segment 502 at the time point denoted by the letter "R." All nodes then begin processing of this group protocol, with processing that depends upon the subgroup to which that node belongs. After processing begins, all nodes transmit a first vote, vote 1 in this example, during a second time segment 504. The transmission of votes by all four nodes in this example is denoted by the letter "X" in this illustration. The different nodes transmit their votes at different times based upon the processing time within the node. The different vote times is illustrated by the different times at which each node transmits its vote, as is illustrated by the "X," within the second time segment 504. The second time segment duration is not necessarily defined by the protocol but is effectively set by the processing time for the first part of the subgroup protocols that end in the first vote. The second time segment 504 occurs after the first time segment 502 but is not required to be immediately after the first time segment 502 as may occur to accommodate processing time for the protocol. After all nodes cast their first vote within the second time segment 504, subgroup 2 is complete with its subgroup protocol since it only required one vote. The vote transmitted by the nodes within subgroup 2 indicates that the vote is a completion vote for that subgroup. This indication is provided by data within the vote group message in the exemplary embodiment.

The processing for this protocol continues with subgroup 1, which includes Node 1 and 2 in this example, continuing with the processing for its subgroup protocol. The nodes of subgroup 1 then cast a second vote, vote 2 which is denoted by an "X," during a third time segment 506. The nodes within subgroup 2, i.e., node 3 and node 4, receive these subgroup votes and transmit a dummy vote, as denoted by the "D" in the third time segment 506. This allows for vote synchronization for all members of the group. The dummy votes, those indicated by the "D," are shown to occur after the regular votes that are cast by the nodes within subgroup 1. Similar voting is performed during a fourth time segment 508, but these votes all indicate that this is a completion vote. The variable duration of processing for each node is also shown by the time dispersion of the votes within each time segment.

Figure 6:
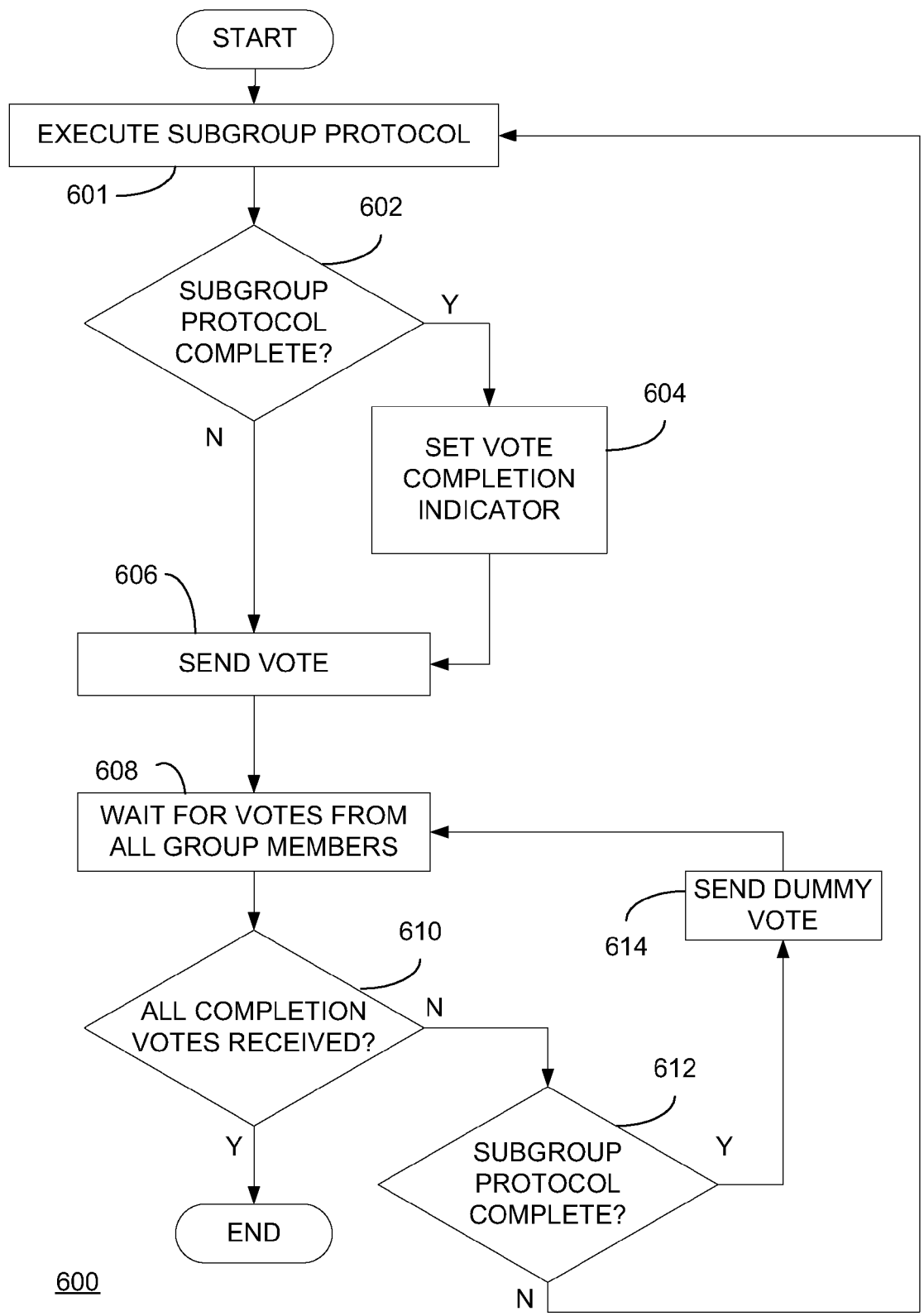
FIG. 6 is a processing flow diagram for vote processing as is performed within a node or group member in an exemplary embodiment of the present invention.

An exemplary processing flow diagram for vote processing 600 as is performed within a node or group member in an exemplary embodiment of the present invention is illustrated in FIG. 6. The vote processing 600 begins by performing, at step 601, the subgroup protocol as defined for the particular embodiment. The processing then advances to determining, at step 602, if the subgroup protocol processing is complete. If the subgroup protocol processing is complete, the processing sets, at step 604, a vote completion indicator within the vote message that is transmitted in a group message.

If the subgroup protocol is not complete on this node, or if the subgroup protocol is complete and the completion indicator has been set, the processing then sends, at step 606, the subgroup protocol vote in a group message to all group members. The processing for this node then waits, at step 608, for all group members to transmit a vote for this round of votes. After all group members have transmitted a vote for this round of votes, the processing continues by determining, at step 610, if completion votes, which are votes with their completion indicator set, have been received from all of the nodes or group members within the group. If completion votes have been received from all group members, the processing terminates.

If completion votes have not been received from all group members, the processing continues by determining, at step 612, if the subgroup protocol is complete. If the subgroup protocol is not complete, the processing returns to executing, at step 601, the appropriate subgroup protocol as is described above. If the subgroup protocol is complete, the processing continues by sending, at step 614, a dummy vote. A dummy vote is a vote that is transmitted by the processing of a node performing a subgroup protocol after the subgroup protocol for that node has completed. Dummy votes are used to advantageously facilitate node synchronization across the entire group when subgroups within that group are executing asymmetric algorithms. After sending a dummy vote, the processing returns to waiting, at step 608, for votes from all group members. The processing then continues after this step as described above.

After execution of the subgroup protocols as described above, the group level protocol is able to perform another portion of a group protocol, such as group protocol portion B 308. A group protocol is also able to specify processing that requires execution of another set of subgroup protocols by the different subgroups after the completion of a first set of subgroup protocols. The synchronization of the subgroups by the above described mechanism advantageously ensures that concurrent subgroups complete their processing prior to advancing to a next stage within the group protocol.

Non-Limiting Software and Hardware Examples

Embodiments of the invention can be implemented as a program product for use with a computer system such as, for example, the cluster computing environment shown in FIG. 1 and described herein. The program(s) of the program product defines functions of the embodiments (including the methods described herein) and can be contained on a variety of computer readable medium. Illustrative computer readable medium include, but are not limited to: (i) information permanently stored on non-writable storage media (e.g., read-only memory devices within a computer such as CROM disk readable by a CD-ROM drive); or (ii) alterable information stored on writable storage media (e.g., floppy disks within a diskette drive or hard-disk drive). Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for performing processing that is distributed among a plurality of nodes, the method comprising:

assigning a node to a first subgroup within a computing system group, the computing system group comprising the first subgroup and a second subgroup, the second subgroup comprising at least a remote node within the computing system group that is not assigned to the first subgroup;

receiving a protocol message at the node, wherein the protocol message is received by all nodes within the computing system group and defines at least a first subgroup protocol processing and a second subgroup protocol processing, the first subgroup protocol processing defining a first number of sequential subprotocols to be performed by members of the first subgroup, each of the first number of sequential protocols requiring a respective vote upon completion, the second subgroup protocol processing defining a second number of sequential subprotocols to be performed by members of the second subgroup, each of the second number of sequential protocols requiring a respective vote upon completion, wherein the second number is greater than the first number;

the first subgroup protocol processing specifying processing that is different from processing specified by the second subgroup protocol processing, executing the first subgroup protocol processing at the node and sending respective votes upon completion of each of the first number of sequential subprotocols;

receiving, from the remote node within the second subgroup in accordance with the protocol message and while executing the first subgroup protocol processing, a second subgroup protocol vote corresponding to a last vote within the first number of votes received from the remote node;

suspending, subsequent to the executing the first subgroup protocol processing and sending respective votes upon completion of each of the first number of sequential subprotocols, execution of protocol processing on the node;

receiving, subsequent to suspending protocol processing and in accordance with the protocol message, a remote node vote from the remote node; and transmitting from the node, subsequent to suspending protocol processing and in response to receiving the remote node vote that was received subsequent to suspending protocol processing, a dummy vote.

2. The method according to claim 1, further comprising:

executing at the node, in response to receiving the remote node vote, an additional protocol processing.

3. The method according to claim 1, wherein the subgroup associates nodes that are collocated at a site.

4. The method according to claim 2, wherein the additional protocol is executed by all nodes within the computing system group.

5. A member of a computing system group, the member comprising:

a subgroup identifier for assigning a node to a first subgroup within a computing system group, the computing system group comprising the first subgroup and a second subgroup, the second subgroup comprising at least a remote node within the computing system group that is not assigned to the first subgroup;

a communications system interface for receiving a protocol message at the node, wherein the protocol message is received by all nodes within the computing system group and defines at least a first subgroup protocol processing and a second subgroup protocol processing, the first subgroup protocol processing defining a first number of sequential subprotocols to be performed by members of the first subgroup, each of the first number of sequential protocols requiring a respective vote upon completion, the second subgroup protocol processing defining a second number of sequential subprotocols to be performed by members of the second subgroup, each of the second number of sequential protocols requiring a respective vote upon completion, wherein the second number is greater than the first number, the first subgroup protocol processing specifying processing that is different from processing specified by the second subgroup protocol processing, a processor for executing the first subgroup protocol processing at the node, and wherein the communications system interface is further adapted to:

sending respective votes upon completion of each of the first number of sequential subprotocols;

receiving, from the remote node within the second subgroup in accordance with the protocol message and while executing the first subgroup protocol processing, a second subgroup protocol vote corresponding to a last vote within the first number of votes received from the remote node;

suspending, subsequent to the executing the first subgroup protocol processing and sending respective votes upon completion of each of the first number of sequential subprotocols, execution of protocol processing on the node;

receiving, subsequent to suspending protocol processing and in accordance with the protocol message, a remote node vote from the remote node; and transmitting from the node, subsequent to suspending protocol processing and in response to receiving the remote node vote that was received subsequent to suspending protocol processing, a dummy vote.

6. The member according to claim 5, wherein:

the processor further executes, in response to receiving the remote node vote, an additional protocol processing.

7. The member according to claim 5, wherein the subgroup associates nodes that are collocated at a site.

8. The member according to claim 6, wherein the additional protocol is executed by all nodes within the computing system group.

9. A computer readable medium tangibly encoded with a computer program, which when executed by a processor, performs processing on a member of a computing system group, the operations comprising:

assigning a node to a first subgroup within a computing system group, the computing system group comprising the first subgroup and a second subgroup, the second subgroup comprising at least a remote node within the computing system group that is not assigned to the first subgroup;

receiving a protocol message at the node, wherein the protocol message is received by all nodes within the computing system group and defines at least a first subgroup protocol processing and a second subgroup protocol processing, the first subgroup protocol processing defining a first number of sequential subprotocols to be performed by members of the first subgroup, each of the first number of sequential protocols requiring a respective vote upon completion, the second subgroup protocol processing defining a second number of sequential subprotocols to be performed by members of the second subgroup, each of the second number of sequential protocols requiring a respective vote upon completion, wherein the second number is greater than the first number, the first subgroup protocol processing specifying processing that is different from processing specified by the second subgroup protocol processing, executing the first subgroup protocol processing at the node and sending respective votes upon completion of each of the first number of sequential subprotocols;

receiving, from the remote node within the second subgroup in accordance with the protocol message and while executing the first subgroup protocol processing, a second subgroup protocol vote corresponding to a last vote within the first number of votes received from the remote node;

suspending, subsequent to the executing the first subgroup protocol processing and sending respective votes upon completion of each of the first number of sequential subprotocols, execution of protocol processing on the node:

receiving, subsequent to suspending protocol processing and in accordance with the protocol message, a remote node vote from the remote node, and transmitting from the node, subsequent to suspending protocol processing and in response to receiving the remote node vote that was received subsequent to suspending protocol processing, a dummy vote.

10. The computer readable medium according to claim 9, wherein the operations further comprise:
executing at the node, in response to receiving the remote node vote, an additional protocol processing.

11. The computer readable medium according to claim 9, wherein the subgroup associates nodes that are collocated at a site.

12. The computer readable medium according to claim 10, wherein the additional protocol is executed by all nodes within the computing system group.

13. The method according to claim 1, further comprising:
receiving, after transmitting the dummy vote, a completion vote from the remote node for the second subgroup protocol processing; and
resuming, in response to receiving the completion vote from the remote node for the second subgroup protocol processing, the protocol processing.

14. The member according to claim 5, wherein:
the communications system is further adapted to receiving, after transmitting the dummy vote, a completion vote from the remote node for the second subgroup protocol processing, and
the processor is further adapted to resuming, in response to receiving the completion vote from the remote node for the second subgroup protocol processing, the protocol processing.

15. The computer readable medium according to claim 9, wherein the operations further comprise:
receiving, after transmitting the dummy vote, a completion vote from the remote node for the second subgroup protocol processing; and
resuming, in response to receiving the completion vote from the remote node for the second subgroup protocol processing, the protocol processing.

* * * * *